US012374215B2

(12) United States Patent
Cook

(10) Patent No.: US 12,374,215 B2
(45) Date of Patent: Jul. 29, 2025

(54) HASHING VEHICLE POSITION DATA IN REAL-TIME TO DETECT BEHAVIOR PATTERNS

(71) Applicant: Maxar Technologies Holdings Inc., Westminster, CO (US)

(72) Inventor: Adam Cook, Sterling, VA (US)

(73) Assignee: Maxar Technologies Holdings, Inc., Westminster, CO (US)

( * ) Notice: Subject to any disclaimer, the term of this patent is extended or adjusted under 35 U.S.C. 154(b) by 244 days.

(21) Appl. No.: 17/932,208

(22) Filed: Sep. 14, 2022

(65) Prior Publication Data

US 2024/0087446 A1 Mar. 14, 2024

(51) Int. Cl.
*G08G 1/01* (2006.01)
*G08G 1/00* (2006.01)

(52) U.S. Cl.
CPC ............. *G08G 1/0125* (2013.01); *G08G 1/22* (2013.01)

(58) Field of Classification Search
CPC ...... G08G 1/0125; G08G 1/22; G08G 5/0013; G08G 5/0026; G08G 5/0043; G08G 5/0052; G08G 1/0112; G08G 1/012; G08G 1/0129; G08G 5/0082; G08G 1/0133
See application file for complete search history.

(56) References Cited

U.S. PATENT DOCUMENTS

2019/0283745 A1* 9/2019 Nagel .................. G08G 1/0112
2021/0142596 A1* 5/2021 Siddique .................. G07C 5/08
2022/0046380 A1* 2/2022 Gawthorpe ............. H04W 4/44

FOREIGN PATENT DOCUMENTS

CN 110334171 A * 10/2019

OTHER PUBLICATIONS

Extended European Search Report for EP23197129, dated Mar. 1, 2024.

* cited by examiner

*Primary Examiner* — Aniss Chad
*Assistant Examiner* — Christine Nguyen Huynh
(74) *Attorney, Agent, or Firm* — Harness, Dickey & Pierce, P.L.C.

(57) ABSTRACT

Systems and methods for detecting vehicle behavior patterns in real-time. One embodiment is a method of continuous vehicle behavior detection. The method includes receiving a vehicle behavior profile including one or more travel patterns that define a vehicle behavior, receiving track data of one or more vehicles, hashing the track data as it is received to generate hash values that uniquely identify cells that approximate locations of the one or more vehicles, and storing the hash values in a hash library. The method also includes analyzing the hash library as the hash values are stored to compare the cells with the one or more travel patterns in the vehicle behavior profile, and in response to determining a group of the cells match the one or more travel patterns, generating a message indicating the vehicle behavior is detected.

13 Claims, 9 Drawing Sheets

HASHING VEHICLE POSITION DATA IN REAL-TIME TO DETECT BEHAVIOR PATTERNS

GOVERNMENT LICENSE RIGHTS

This invention was made with government support under Contract Number 140D0420C0077 awarded by the U.S. Department of the Interior, Interior Business Center. The government has certain rights in the invention.

Various industries employ systems for analyzing geospatial data to detect patterns or behavior of vehicles (e.g., aircraft, ships, cars, etc.) over a large geographic area. Typically, such systems analyze the geospatial data using a batch processing technique to detect patterns within large datasets. This means that instead of processing the data as it arrives, it is stored for processing at a more opportune time or as resources permit. Real-time or continuous-based processing allows more immediate detection of behavior than batch-based processing. However, it is difficult to implement real-time processing for a large area without incurring large costs. Accordingly, techniques which improve the efficiency and cost of real-time geospatial analysis are sought.

Hashing Vehicle Position Data in Real-Time to Detect Behavior Patterns

Embodiments described herein provide techniques for detecting vehicle behavior patterns in real-time. One embodiment is a method of continuous vehicle behavior detection. The method includes receiving a vehicle behavior profile including one or more travel patterns that define a vehicle behavior, receiving track data of one or more vehicles, hashing the track data as they are received to generate hash values that uniquely identify cells that approximate locations of the one or more vehicles, and storing the hash values in a hash library. The method also includes analyzing the hash library as the hash values are stored to compare the cells with the one or more travel patterns in the vehicle behavior profile, and in response to determining a group of the cells match the one or more travel patterns, generating a message indicating the vehicle behavior is detected.

In a further embodiment, the method includes detecting two vehicles co-traveling based on a temporal analysis of the hash values stored in the hash library. In another further embodiment, the method includes geohashing the track data to generate geohashed cells, wherein the temporal analysis includes comparing the geohashed cells to detect the two vehicles co-traveling. In yet another further embodiment, the temporal analysis is performed in real-time. In another further embodiment, the method includes assigning processing nodes of a distributed computing system to the cells. In still another further embodiment, the method includes initiating an additional pattern analysis in response to detecting the vehicle behavior; and adjusting a resolution of the cells for the additional pattern analysis. In a further embodiment, the method includes, in response to determining the group of the cells do not match the one or more travel patterns, deallocating memory in the hash library.

Another embodiment is a method of refining track data for vehicle behavior analysis. The method includes receiving track data of a moving object, calculating one or more kinematic attribute values from the track data of the moving object, and applying the one or more kinematic attribute values to the vehicle behavior analysis in response to determining the one or more kinematic attribute values indicate valid vehicle movement data. The method also includes determining a vehicle behavior of the moving object based on the vehicle behavior analysis detecting a match between the one or more kinematic attribute values and kinematic behavior criteria of a predefined vehicle behavior pattern.

In a further embodiment, the method includes performing the vehicle behavior analysis based on a first comparison of hashed vector data of the track data to the predefined vehicle behavior pattern and a second comparison of the one or more kinematic attribute values to the kinematic behavior criteria. In another further embodiment, the method includes determining the vehicle behavior of the moving object if the hashed vector data matches the predefined vehicle behavior pattern and the one or more kinematic attribute values match the kinematic behavior criteria. In yet another further embodiment, the method includes filtering the track data from the vehicle behavior analysis in response to determining the one or more kinematic attribute values indicate invalid vehicle movement data. In another further embodiment, the method includes aggregating kinematic attribute values of a kinematic attribute for a time window, and associating the kinematic attribute values of the time window with hashed vector data of the track data. In yet another further embodiment, the method includes adding the one or more kinematic attribute values to the track data as the track data progresses. In some embodiments, the one or more kinematic attribute values include one or more of a convex hull value, total turning value, total curvature value, efficiency value, and acceleration value.

Other example embodiments (e.g., systems, methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific example embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure and are to be construed as being without limitation to such specifically recited examples and conditions. As a result, the disclosure is not limited to the specific embodiments or examples described below, but by the claims and their equivalents.

Figure 1:
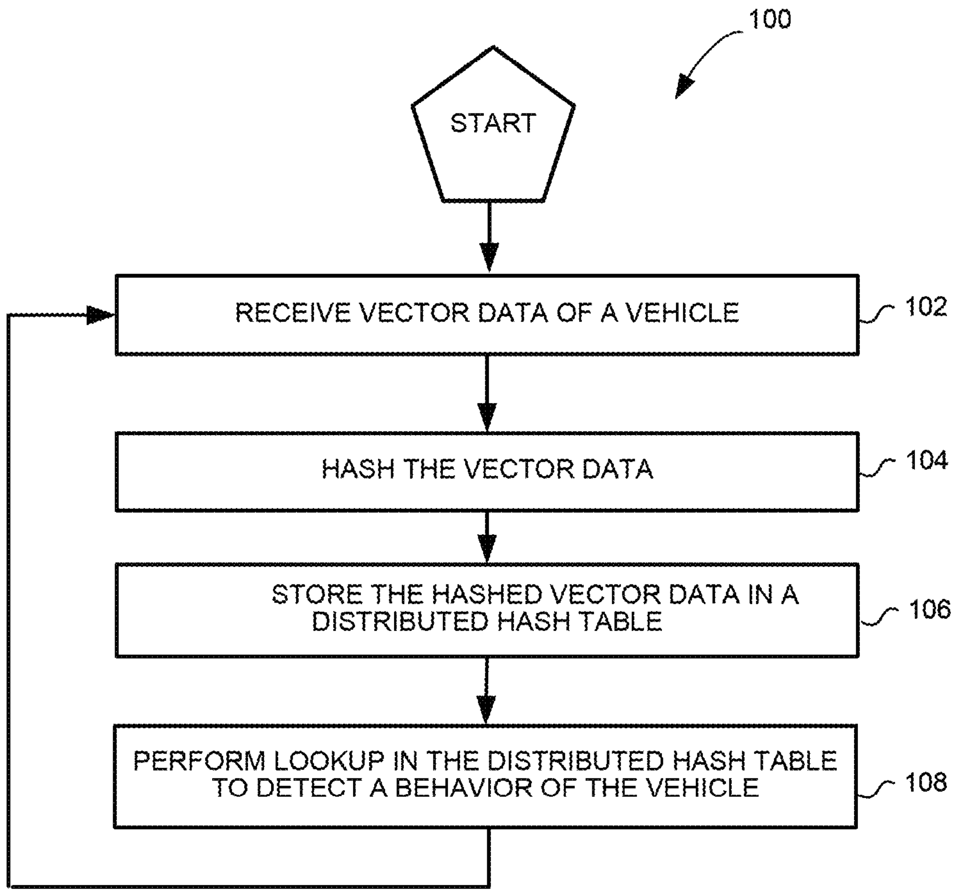
FIG. 1 is a flowchart illustrating a method of continuous vehicle behavior detection in an illustrative embodiment.

FIG. 1 is a flowchart illustrating a method 100 of continuous vehicle behavior detection in an illustrative embodiment. In step 102, vector data of a vehicle is received. In step 104, the vector data is hashed. In step 106, the hashed vector data is stored in a distributed hash table. In step 108, a lookup is performed in the distributed hash table to detect a behavior of the vehicle. The method 100 may repeat on a continual basis. Additionally, vector data for many vehicles may be received concurrently, and vector data may be received out of order and handled accordingly.

Figure 2:
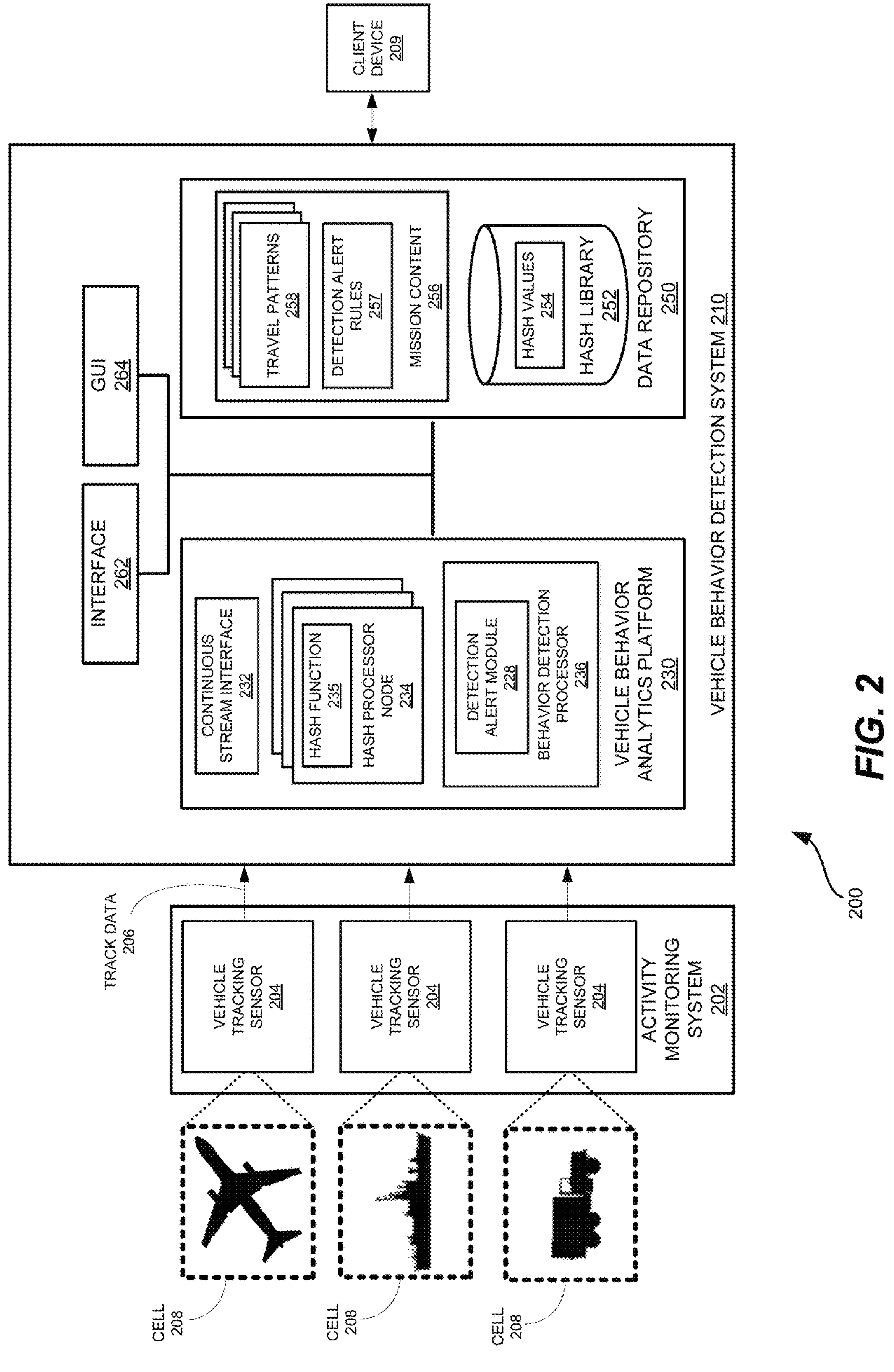
FIG. 2 is an example environment in which a vehicle behavior detection system 110 may operate in accordance with some embodiments.

FIG. 2 is an example environment 200 in which a vehicle behavior detection system 210 may operate in accordance with some embodiments. The vehicle behavior detection system 210 is configured to interface with an activity monitoring system 202 including one or more vehicle tracking sensors 204 that monitor geographic areas and track vehicle positions. The vehicle tracking sensors 204 provide raw track data 206 of the vehicles to the vehicle behavior detection system 210. The vehicle tracking sensors 204 may comprise any combination of systems and/or devices capable of identifying one or more location coordinates of a vehicle and/or transmitting the track data 206 to the vehicle behavior detection system 210.

The vehicles may comprise air vehicles (e.g., aircraft, helicopters, unmanned air vehicles, etc.), land vehicles (e.g., cars, trucks, etc.), and/or water vehicles (e.g., maritime vessels, ships, boats, etc.). The track data 206 may thus comprise, for example, automatic dependent surveillance-broadcast (ADS-B) data transmitted for air objects and/or automatic identification system (AIS) data transmitted for sea objects. Alternative or additional types of vehicle position sensor data, such as global positioning system (GPS) data, radar data, etc., may be provided to the vehicle behavior detection system 210. In one embodiment, the track data 206 comprises vector data describing a series of positions of a vehicle over time. Alternatively or additionally, the track data 206 may include a vehicle identifier and/or one or more domains of data such as a geographic domain (e.g., location), a kinematic domain (e.g., speed, bearing, etc.), and/or time domain (e.g., timestamps).

In one embodiment, the vehicle behavior detection system 210 includes a vehicle behavior analytics platform 230 comprising a continuous stream interface 232, hash processor nodes 234, and a behavior detection processor 236. As the track data 206 are received via the continuous stream interface 232, the hash processor nodes 234 perform hash functions 235 to encode the data as hash values 254 on a continuous basis (e.g., in real-time or near real-time). The hash values 254 may each comprise a string of characters representing a location of a vehicle as a cell 208 (e.g., two-dimensional rectangular range of latitude-longitude). Alternatively or additionally, the hash values 254 may comprise long integers to improve efficiency for truncating precision from the hash. In any case, the hash values 254 may subdivide a geographic region or reference area into a grid of contiguous subregions according to a hierarchical geospatial indexing system.

One example of a geospatial indexing system is geohash. Geohashing algorithms use base-32 alphabet encoding to divide a geographic area into a grid with 32 cells. The first character in a geohash identifies the initial location as one of the 32 cells. This cell will also contain 32 cells, and each one of these will contain 32 cells (and so on repeatedly). Adding characters to the geohash sub-divides a cell, effectively zooming in to a more detailed area. For example, a first character in the string may represent a cell that is 5,000 kilometers (km) high and 5,000 km wide, a sixth character in the string may represent a cell that is 0.61 km high and 1.22 km wide, and ninth character in the string may represent a cell that is 4.77 meters (m) high and 4.77 m wide.

In some embodiments, the hash functions 235 perform geohashing or a variation of it such as Z-curve (also known as Morton Code) or Hilbert Curve. In one embodiment, a Z-curve is implemented in which each encoded character is five bits of information, which equates to five subdivisions of space. The hash functions 235 may also perform a timehash algorithm to subdivide the timeline into discrete segments (e.g., a thirty second cell from 2022-01-01 01:00:15 to 2022-01-01 01:00:45). The hash functions 235 may thus create a temporal signature that comprises a spatiotemporal hash. Alternatively or additionally, the hash functions 235 perform one or more other types of hash algorithms such as H3 cell and/or S2 cell. In still another embodiment, a customized geohash may be generated by applying some tailored function to the track data 206.

The hash processor nodes 234 may store the hash values 254 in a hash library 252 of a data repository 250. The data repository 250 may also store mission content 256 including one or more travel patterns 258 and detection alert rules 257. As described in greater detail below, the behavior detection processor 236 is configured to analyze the hash library 252 in view of the mission content 256 to automatically and continuously detect vehicle behaviors or patterns occurring in real-time or near real-time. The data repository 250 may comprise a database and/or storage service residing on one or more servers or storage devices. The hash library 252 may include one or more tables in a distributed database management system (DBMS), a clustered database, and/or any storage software residing on one or more physical storage devices. Alternatively or additionally, the hash library 252 may comprise one or more noSQL databases implementing key-value data storage such as Accumulo, HBase, or the like. The distributed structure of the hash library 252 enables parallelization and the implementation of distributed algorithms such as MapReduce to scale horizontally using a large number of computer nodes (e.g., hash processor nodes 234). Examples of a storage device may include, but are not limited to, a hard disk drive, a solid state drive, and/or other memory device.

The behavior detection processor 236 includes functionality to monitor and detect for a particular vehicle behavior defined in the travel patterns 258. In doing so, the behavior detection processor 236 may perform a temporal analysis on the hash library 252 to match the cells 208 to a predefined pattern. That is, hash values 254 may be used as input to a hash table to identify a cell 208 that matches certain criteria. For example, if two aircraft are co-located in a common cell 208 of a particular cell granularity (e.g., within 100 m) for a threshold period of time (e.g., 5 minutes), the behavior detection processor 236 may detect that the two aircraft are co-traveling.

Other example aircraft behaviors for which travel patterns 258 may be created include air refueling operations, combat air patrol formations, escort aircraft identification, and/or travel along defined commercial routes. Similar behavior detection of ground vehicle fleets or maritime vessels may by performed. For example, a loitering behavior may be detected if two or more ships are within a threshold proximity without sufficient movement for a threshold period of time. Additional examples of vehicle behavior and travel patterns 258 include orbit patterns (e.g., cells 208 repeat), anomalous patterns, and/or malicious patterns defined for an individual aircraft. Numerous other types of vehicle behaviors may be identified and each travel pattern 258 may define one or multiple thresholds or patterns to be met and may include or associate with one or multiple detection alert rules 257 for generating notifications of detected behavior.

In one embodiment, the behavior detection processor 236 includes a detection alert module 228 configured to generate and transmit alerts according to the detection alert rules 257 of a particular behavior that has been confirmed as detected (by detection of its associated pattern). For example, the detection alert module 228 may communicate or push alerts to a client device 209 on a periodic basis as defined in the detection alert rules 257 as the behavior detection processor 236 continues to detect the behavior in real-time. The message may include text description or graphical display of the vehicle positions or behavior for a period of time. In some embodiments, the message includes a key from a key-value pair of the hash value 254 such that a lookup operation can be performed for the behavior. Additionally, the behavior detection processor 236 may track the state of detected behaviors as they are happening to provide updated notifications and aggregations as information is received. The behavior detection processor 236 may also detect and monitor event-based applications. For example, after hashes and metadata are stored, behaviors may be described as a series of events matching a pattern (e.g., consistent hash movement followed by no movement, followed by a metadata pattern, and not followed by some other pattern).

The vehicle behavior analytics platform 230 may comprise a software application or a set of related software applications configured to execute on one or more hardware processors. In some embodiments, one or more components of the vehicle behavior analytics platform 230 reside in a cloud computing application in a network distributed system. Alternatively or additionally, in some embodiments, the vehicle behavior analytics platform 230 is configured to perform operations on a continuous basis using streaming software such as Kafka. The operations may be performed using a computing framework such as Spark or Hadoop.

Leveraging streaming and processing tools such as these advantageously allows efficient hashing and retrieval of location-based data in the hash library 252. Thus, vehicle patterns can be detected on a continuous basis. The hash processor nodes 234 may each be assigned to a particular group of cells 208 to distribute the hash processing. Similarly, multiple instances of the behavior detection processor 236 may be assigned to a particular group of cells 208 and/or one or more travel patterns 258 to distribute the behavior detection processing. Although the hash processor nodes 234 and behavior detection processor 236 are shown for the sake of conceptual clarity as separate functional units, these functions may be implemented as software processes on the same processor, same group of processors, same computing device, and/or same group of computing devices.

The vehicle behavior detection system 210 further includes a communication interface 262 and/or graphical user interface (GUI) 264 to communicate and display data. The communication interface 262 may comprise a component or device (e.g., transceiver, antenna, etc.) configured to perform wired and/or wireless communication over a network with other systems and devices such as the client device 209. Illustrative examples and details of the operation of the vehicle behavior detection system 210 are discussed below.

Figure 3:
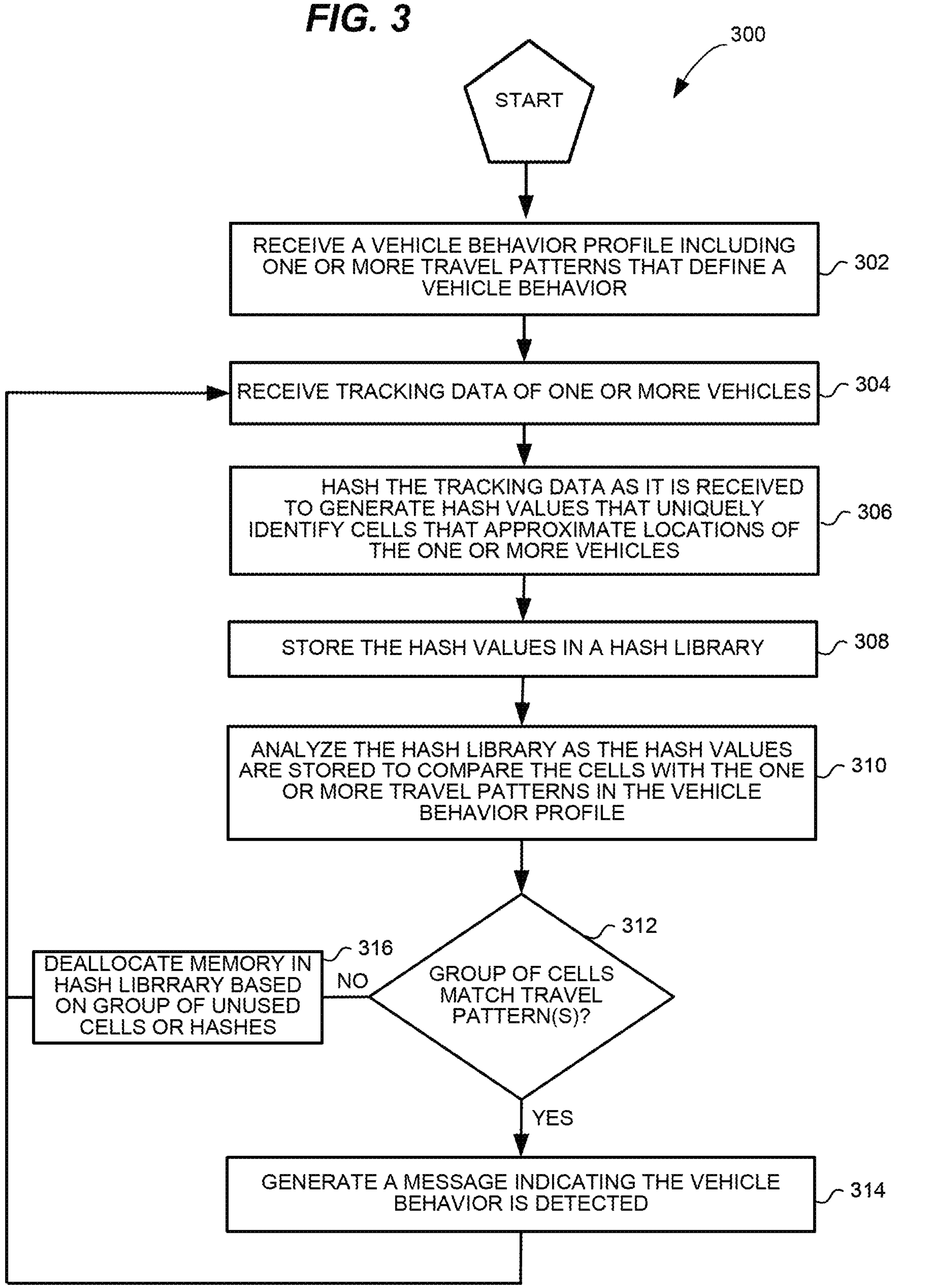
FIG. 3 is a flowchart illustrating a method of continuous vehicle behavior detection in another illustrative embodiment.

FIG. 3 is a flowchart illustrating a method 300 of continuous vehicle behavior detection in another illustrative embodiment. The methods herein may be described with respect to the vehicle behavior detection system 200 of FIG. 2, although one skilled in the art will recognize that the methods may be performed with other environments and systems. The steps of the methods described herein are not all inclusive, may include other steps not shown, and may also be performed in alternative orders.

In step 302, the interface 262 receives a vehicle behavior profile including one or more travel patterns 258 that define a vehicle behavior. In step 304, the continuous stream interface 232 receives track data 206 of one or more vehicles. In step 306, the hash processor nodes 234 hash the track data 206 as it is received to generate hash values 254 that uniquely identify cells 208 that approximate locations of the one or more vehicles. In step 308, the hash processor nodes 234 store the hash values 254 in the hash library 252.

In step 310, the behavior detection processor 236 analyzes the hash library 252 as the hash values 254 are stored to compare the cells 208 with the one or more travel patterns 258 in the vehicle behavior profile. In step 312, the behavior detection processor 236 determines whether a group of the cells 208 match the one or more travel patterns 258. If so (i.e., yes in step 312), the method 300 proceeds to step 314 in which the behavior detection processor 236 generates a message indicating the vehicle behavior associated with the matched pattern has been detected. Otherwise (i.e., no in step 312), the method 300 proceeds to step 316 and the behavior detection processor 236 deallocates memory in the hash library 252 based on the unused group of cells 208 or associated hashes. After steps 314 or 316, the method 300 may return to step 304 to continuously operate on track data 206 as it is received for detecting the particular vehicle behavior on a real-time or near real-time basis.

Figure 4:
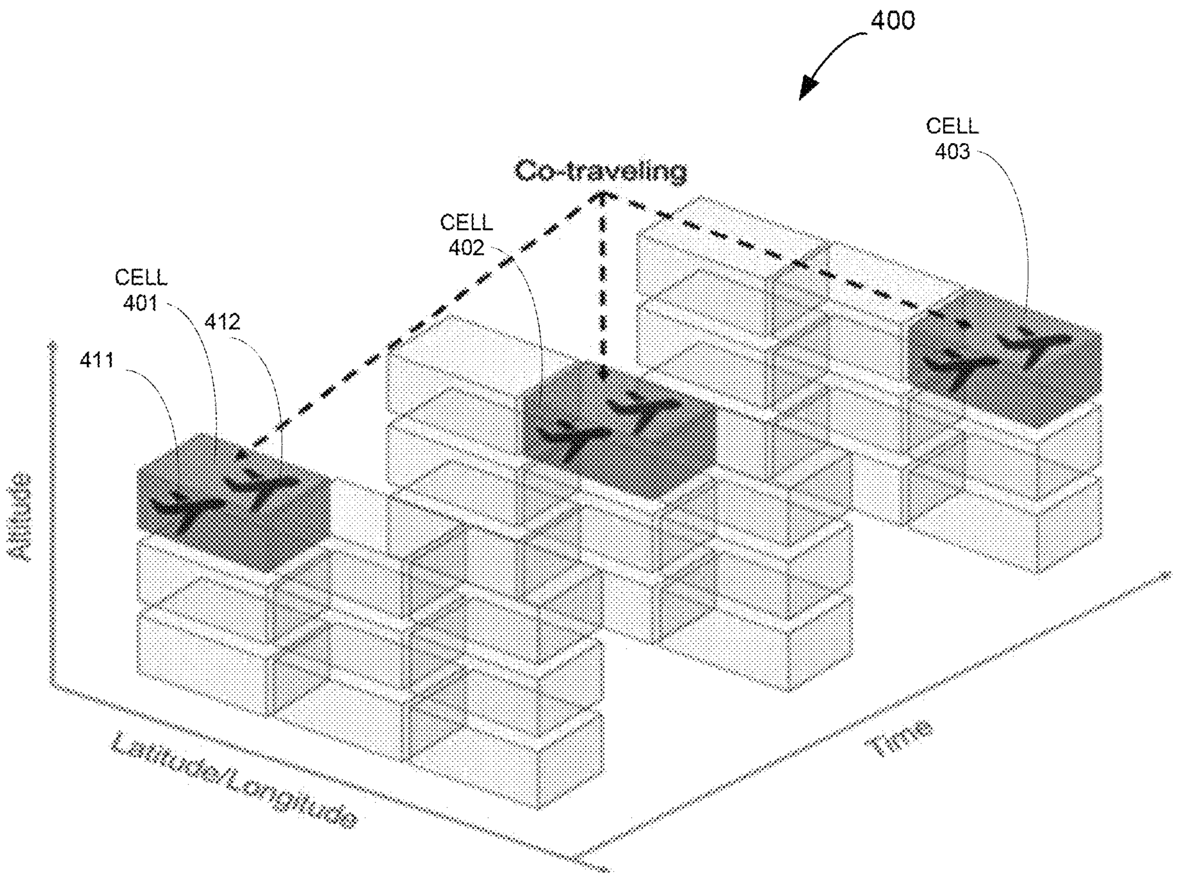
FIG. 4 shows an illustration of an example of co-traveling behavior that may be detected in accordance with some embodiments.

FIG. 4 shows an illustration 400 of an example of co-traveling behavior that may be detected in accordance with some embodiments. The blocks or rectangles in the illustration 400 represent cells which may be geohashed according to a resolution level defined for detecting an aircraft co-travelling event. Each cell represents an area bound by a unique pair of latitude and longitude lines corresponding to an alphanumeric string, which may be referred to as a geohash string or geohash code.

Using the components and/or techniques previously described with respect to FIGS. 1-3, a first aircraft 411 and second aircraft 412 may be determined to be located in common cells 401-403 over time. For example, the latitude and longitude (lat/long) of the aircrafts 411-412 may be encoded to a short string of characters by one or more of the hash processor nodes 234 with the cells 401-403 geohashed and stored in memory. The geohashed cells 401-403 may include a hashed time domain to define another dimension by which the aircrafts 411-412 may be compared. The behavior detection processor 236 may be assigned to process the data associated with each of the cells 401-403 and analyze their geohashed values as they arrive in the hash library 252.

For this example, suppose further that the behavior detection processor 236 is assigned to search for a co-travelling pattern predefined in memory. The co-travelling pattern may include or define, for example, a resolution level or a threshold distance between aircraft and a threshold consecutive period of time of being co-located within a cell at that resolution level. The behavior detection processor 236 may retrieve the relevant assigned geohashed cells 401-403 to determine that two aircrafts 401-403 have been co-located at a distance less than the threshold distance and for longer than the threshold time. This may be done by comparing the spatial index strings as they are populated in the hash library 252 over time and determining that a criteria match has been sufficiently maintained for a defined period of time.

In some embodiments, a detected vehicle behavior initiates further detection processes. For example, in response to detecting that the two aircrafts 401-402 are co-travelling, a deeper analysis may be triggered to determine whether the two aircrafts 401-402 are performing an aerial refueling operation. The fueling behavior profile or pattern may share similarities to co-travelling but with additional or alternative thresholds which define its behavior and distinguish it from simple co-travelling. For example, criteria for aircraft refueling may include a smaller distance threshold or a requirement that one aircraft be loitering or on an intercept course with the other aircraft prior to the period of co-travelling. Advantageously, using the hashing technique described above, the additional hash analysis may be performed at a different resolution with minimal computation hit. That is, because the hash convention for detecting refueling is similar to detecting co-traveling, a lookup operation performed by the behavior detection processor 236 may perform a similar comparison on the existing dataset.

Figure 5:
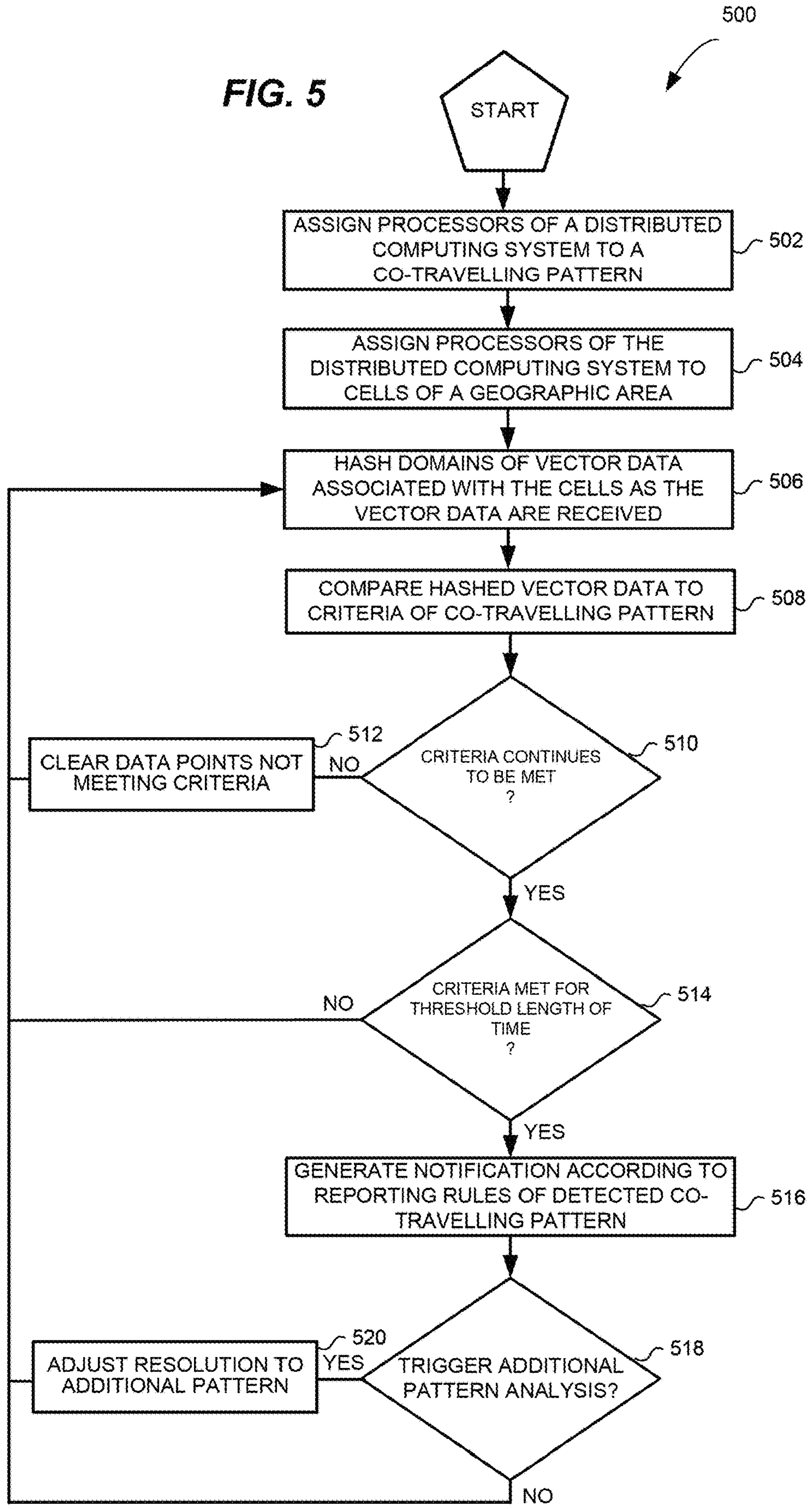
FIG. 5 is a flowchart illustrating a method of continuous vehicle behavior detection of co-travelling in an illustrative embodiment.

FIG. 5 is a flowchart illustrating a method 500 of continuous vehicle behavior detection of co-travelling in an illustrative embodiment. In step 502, the vehicle behavior analytics platform 230 assigns processors of a distributed computing system (e.g., one or more behavior detection processors 236) to a co-travelling pattern. In step 504, the vehicle behavior analytics platform 230 assigns processors of the distributed computing system (e.g., one or more hash processor nodes 234) to cells of a geographic area. In step 506, the processors (e.g., one or more hash processor nodes 234) hash domains of vector data associated with the cell as vector data is received. In step 508, the processors (e.g., one or more behavior detection processors 236) compare hashed vector data to criteria of the co-travelling pattern.

In step 510, the processors (e.g., one or more behavior detection processors 236) determine whether criteria of the co-travelling pattern continues to be met. If not (i.e., no in step 510), the method 500 proceeds to step 512 in which the vehicle behavior analytics platform 230 clears data points from the data repository 250 which are not meeting criteria and then returns to step 506 to repeat steps 506-510 on a continual basis. For example, if the criteria is not met for too many consecutive computing cycles in a row or for too many computing cycles within a period of time, the vehicle behavior analytics platform 230 may reallocate memory to be used for other hash values being actively tracked. Otherwise, (i.e., yes in step 510), the method 500 proceeds to step 514.

In step 514, the processors (e.g., one or more behavior detection processors 236) determine whether criteria of the co-travelling pattern is met for a threshold length of time. For example, the processors may determine whether two vehicles share a common cell for a threshold period of time or for a threshold number of computing cycles. If not, (i.e., no in step 514), the method 500 returns to step 506 to repeat steps 506-510 on a continual basis. Otherwise (i.e., yes in step 514), the method 500 proceeds to step 516 in which the vehicle behavior analytics platform 230 generates a notification according to reporting rules of the detected co-travelling pattern. Thereafter, the method 500 proceeds to step 518.

In step 518, the processors determine whether an additional pattern analysis is triggered. If so (i.e., yes in step 518), the method proceeds to step 520 in which the processors adjust the resolution to the additional pattern to be performed. Thereafter, the method 500 returns to step 506 to repeat the process. Otherwise (i.e., no in step 518), the method 800 returns to step 506 without adjusting the resolution to continue monitoring for detected behavior on a continual basis.

Figure 6:
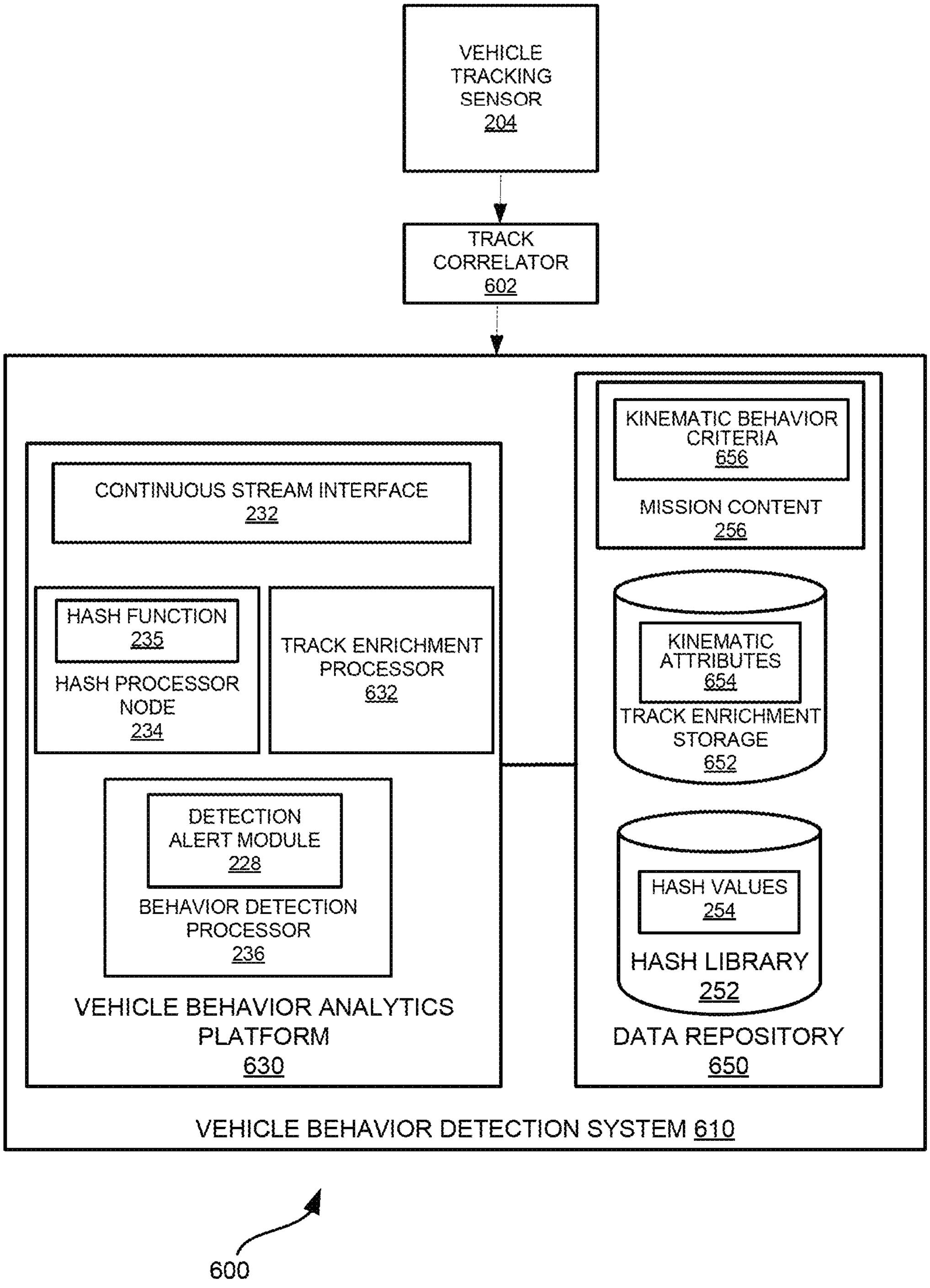
FIG. 6 is another example environment in which a vehicle behavior detection system may operate in accordance with some embodiments.

FIG. 6 is another example environment 600 in which a vehicle behavior detection system 610 may operate in accordance with some embodiments. As thousands or tens of thousands of tracks may be concurrently streamed from vehicle tracking sensors 204 to the vehicle behavior detection system 610, a track correlator 602 may be provided therebetween to manage the tracks. That is, the vehicle behavior detection system 610 may include or interface with the track correlator 602 which is configured to combine track data from the vehicle tracking sensors 204, determine which sources to correlate together based on their position and characteristics, and to filter duplicate or erroneous tracks. The track correlator 602 is therefore configured to produce highly reliable and formatted tracks for the continuous stream interface 232.

Additionally, the vehicle behavior detection system 610 may include a vehicle behavior analytics platform 630 that is enhanced with one or more track enrichment processors 632 configured to operate on the incoming tracks to provide further track filtering functionality and/or to augment vehicle behavior detection. Each track enrichment processor 632 may be assigned to one or multiple tracks (sometimes called track streams or paths). As a track stream is received at the continuous stream interface 232, the assigned track enrichment processor 632 extracts or calculates kinematic attributes 654 from the track stream. The calculated kinematic attributes 654 are stored in track enrichment storage 652 of a data repository 650. Examples of kinematic attributes 654 include convex hull, total turning (e.g., absolute value of total bearing changes over time), total curvature (e.g., summation of bearing changes that is not an absolute value), total travel distance, distance efficiency, acceleration, and jerk.

To filter out track data that is invalid or of low quality, the track enrichment processor 632 may compare calculated kinematic attributes 654 with respect to kinematic behavior criteria 656 to determine a validity and/or quality of a given track. The kinematic behavior criteria 656 may comprise kinematic threshold values or ranges defined for a period of time to indicate track validity and/or quality. The kinematic behavior criteria 656 may be stored in mission content 256 and define criteria for one or more types of kinematic attributes, types of tracks, and/or expected travel patterns 258. If a certain kinematic attribute of a moving object and/or its expected behavior is outside the accepted range for too long and/or too frequently over a period of time, the track enrichment processor 632 determines the track is invalid or low quality. For example, the track enrichment processor 632 may determine a track relating to an aircraft flight path to be invalid if a total turning value calculated from the track indicates too much variance (e.g., indicating the track relates to a non-vehicle object such as a weather pattern or a different type of vehicle/behavior not of interest, etc.). Accordingly, if a track is determined to be invalid or low quality, the track enrichment processor 632 may exclude the track from further downstream behavior detection processing to save computing resources.

On the other hand, if the comparison of calculated kinematic attributes 654 to kinematic behavior criteria 656 indicates the track is valid and/or of high quality, the track enrichment processor 632 may provide the calculated kinematic attributes 654 to the behavior detection processor 236 for enhanced vehicle behavior detection. That is, in addition to using a hash to detect vehicle behavior as previously described, the behavior detection processor 236 may also use the calculated kinematic attributes 654 to bolster vehicle behavior detection. In that regard, as an alternative or in addition to the kinematic behavior criteria 656 defining criteria for validity or quality, the kinematic behavior criteria 656 may define secondary or supplemental criteria for determining or detecting a vehicle behavior pattern. This kinematic behavior criteria 656 may be associated with or included with a particular travel pattern 258.

The behavior detection processor 236 may analyze the calculated kinematic attributes 654 with respect to the kinematic behavior criteria 656 to validate or confirm its vehicle behavior pattern determined from the hash. Alternatively or additionally, the behavior detection processor 236 may use the calculated kinematic attributes 654 to detect a specific type or refinement of a vehicle behavior pattern. For example, the behavior detection processor 236 may detect a vehicle traveling in an orbit pattern by processing hash values 254 to detect repeating cells 208, and further determine that an orbit pattern of specific interest is detected by determining that a convex hull value calculated from the track is between five nautical miles and twenty nautical miles. This additional layer of behavior analysis may inform or enhance other functions of the behavior detection processor 236 previously described such as notification generation, pattern resolution adjustment, memory deallocation, etc. Additional details of the operation of the vehicle behavior detection system 610 are discussed below.

Figure 7:
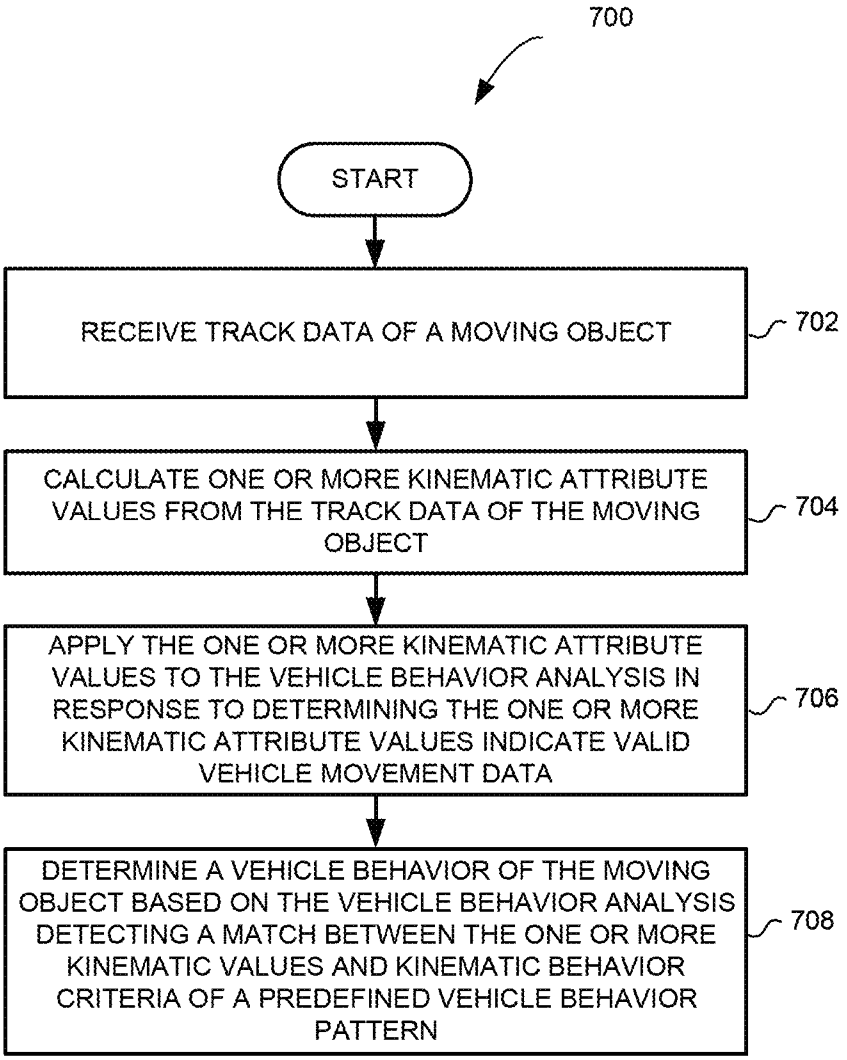
FIG. 7 is a flowchart illustrating a method of refining track data for vehicle behavior analysis in an illustrative embodiment.

FIG. 7 is a flowchart illustrating a method 700 of refining track data for vehicle behavior analysis in an illustrative embodiment. The methods herein may be described with respect to the vehicle behavior detection systems 210/610 of FIGS. 2 and 6, although one skilled in the art will recognize that the methods may be performed with other environments and systems. The steps of the methods described herein are not all inclusive, may include other steps not shown, and may also be performed in alternative orders.

In step 702, the continuous stream interface 232 receives track data of a moving object. In step 704, the track enrichment processor 632 calculates one or more kinematic attribute values from the track data of the moving object. In step 706, the track enrichment processor 632 applies the one or more kinematic attribute values to a vehicle behavior analysis (e.g., performed downstream at the behavior detection processor 236) in response to determining the one or more kinematic attribute values indicate valid vehicle movement data. In step 708, the behavior detection processor 236 determines a vehicle behavior of the moving object based on the vehicle behavior analysis detecting a match between the one or more kinematic attribute values and kinematic behavior criteria of a predefined vehicle behavior pattern.

Figure 8:
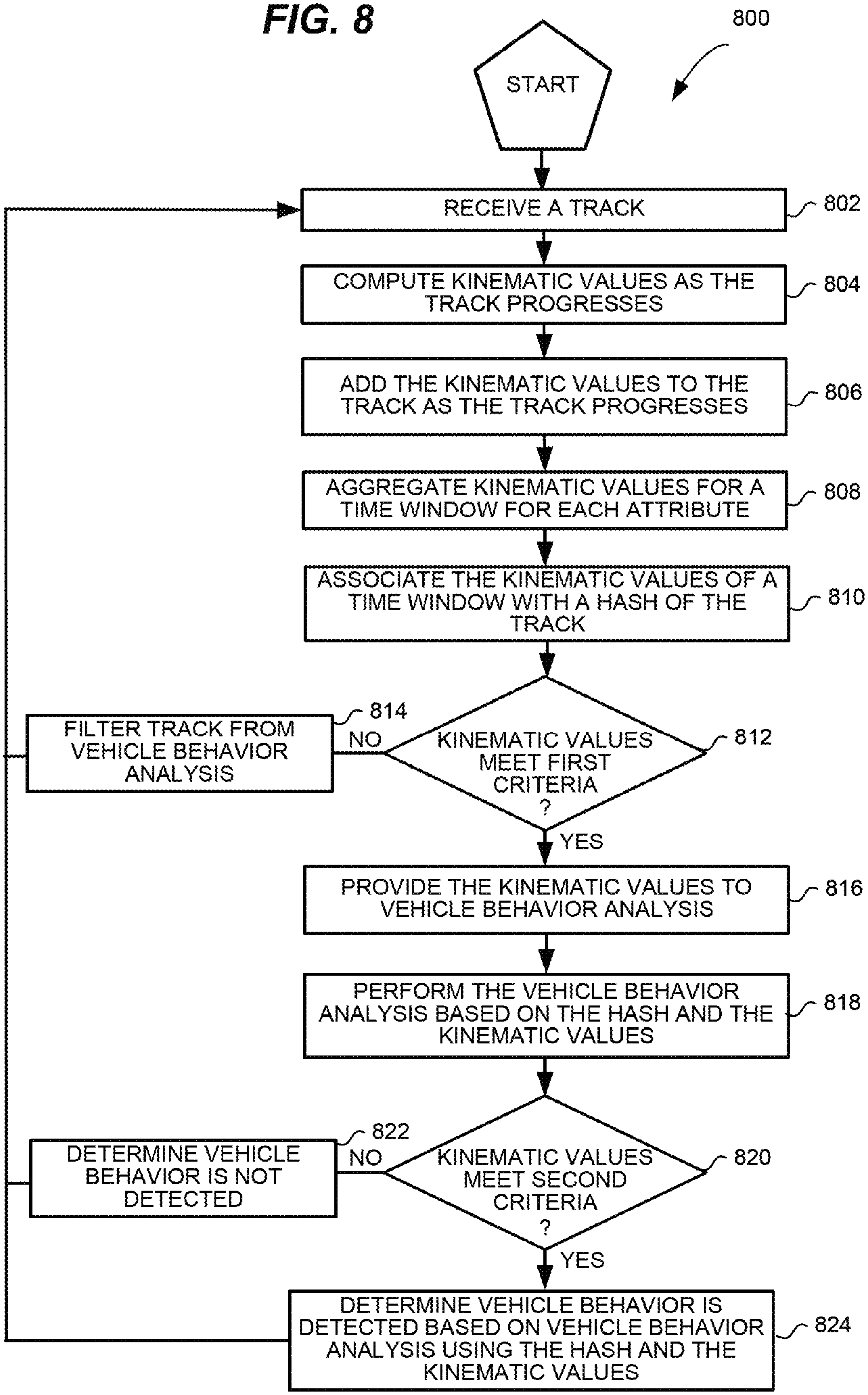
FIG. 8 is a flowchart illustrating a method of refining track data for vehicle behavior analysis in another illustrative embodiment.

FIG. 8 is a flowchart illustrating a method 800 of refining track data for vehicle behavior analysis in another illustrative embodiment. In step 802, the continuous stream interface 232 receives a track. In step 804, the track enrichment processor 632 computes kinematic values from the track as the track progresses. In step 806, the track enrichment processor 632 adds the kinematic values to the track as the track progresses. Accordingly, the track enrichment processor 632 may generate a kinematic profile describing values of one or more kinematic attributes computed for a period of time. The computation and window of time may vary for each kinematic attribute, and the track enrichment processor 632 is generally configured to track or maintain the state of track data to enable the computations performed for a given track. For example, a first kinematic attribute for a track may have values computed from a previous data point and a second kinematic attribute for the track may have values computed from the beginning data point.

In step 808, the track enrichment processor 632 aggregates the kinematic values for a time window for each attribute. In step 810, the track enrichment processor 632 associates the kinematic values of a time window with a hash of the track. In that regard, the track enrichment processor 632 is configured to operate concurrently or in conjunction with a hash processor node 234 performing a hash function 235 on the track. The kinematic values of a time window may be resampled (e.g., down sampled) to correspond with the hash values 254 of the track. In one embodiment, the kinematic values are not hashed but are associated with the hash and/or included as a component of the hash signature.

In step 812, the track enrichment processor 632 determines whether the kinematic values meet first criteria. If not (i.e., no in step 812), the method 800 proceeds to step 814 and the track enrichment processor 632 filters the track from vehicle behavior analysis. The method 800 may then return to step 802. Otherwise (i.e., yes in step 812), the method 800 proceeds to step 816 and the track enrichment processor 632 provides the kinematic values to the vehicle behavior analysis. In step 818, the behavior detection processor 236 performs the vehicle behavior analysis based on the hash and associated kinematic values. In step 820, the behavior detection processor 236 determines, based on the vehicle behavior analysis, whether the kinematic values meet second criteria. If not (i.e., no in step 820), the method 800 proceeds to step 822 and the behavior detection processor 236 determines the vehicle behavior is not detected. The method 800 may then return to step 802. Otherwise (i.e., yes in step 820), the method 800 proceeds to step 824 and the behavior detection processor 236 determines the vehicle behavior is detected based on the vehicle behavior analysis using the hash and the associated kinematic values. Thereafter, the method 800 may return to step 802 to continuously validate track data and detect vehicle behaviors or patterns using track enrichments.

Figure 9:
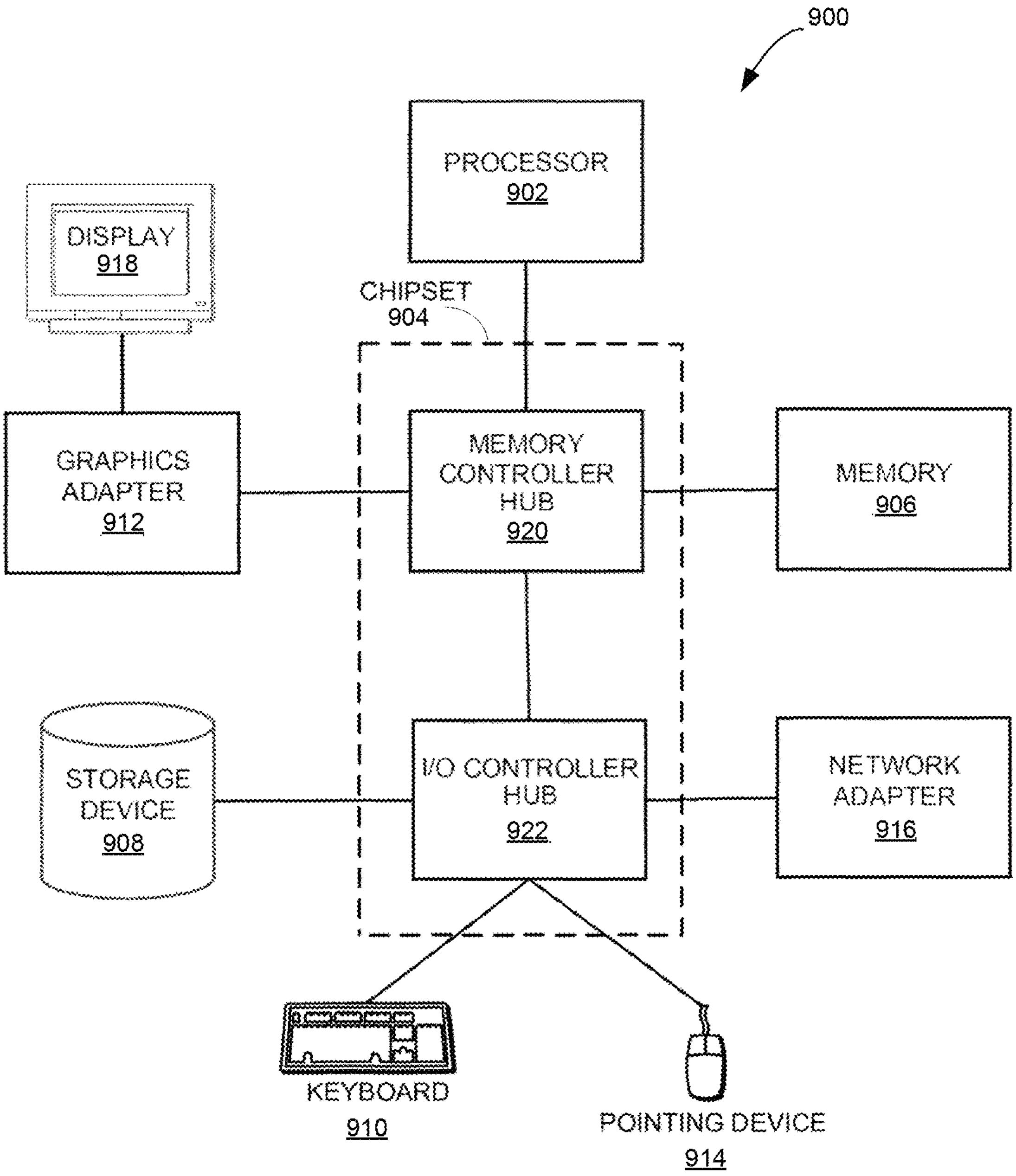
FIG. 9 is a block diagram that illustrates a computer system in accordance with some embodiments.

The entities shown in FIGS. 2 and 6 are implemented using one or more computers. FIG. 9 is a block diagram that illustrates a computer system 900 for acting as hash processor node 234, track enrichment processor 632, and/or behavior detection processor 236 according to some embodiments. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is any non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 900. The graphics adapter 912 displays images and other information on the display 918. The network adapter 916 couples the computer system 900 to a network.

As is known in the art, a computer 900 can have different and/or other components than those shown in FIG. 9. In addition, the computer 900 can lack certain illustrated components. For example, the computer can be formed of multiple blade servers linked together into one or more distributed systems and lack components such as keyboards and displays. Moreover, the storage device 908 can be local and/or remote from the computer system 900 (such as embodied within a storage area network (SAN)).

Although specific embodiments are described herein, the scope of the disclosure is not limited to those specific embodiments. The scope of the disclosure is defined by the following claims and any equivalents thereof.

What is claimed is:

1. A method of continuous vehicle behavior detection, the method comprising:

receiving a vehicle behavior profile including one or more travel patterns that define a vehicle behavior;

receiving track data of one or more vehicles;

(a) hashing, by a computing device, the track data as it is received to generate geohash values that uniquely identify spatial cells that approximate locations of the one or more vehicles;

(b) storing the geohash values in a hash library;

(c) analyzing, by the computing device, the hash library as the geohash values are stored, for multiple of the one or more vehicles, to determine whether a group of different ones of the spatial cells over time matches any of the one or more travel patterns in the vehicle behavior profile; and in response to determining the group of the different ones of a group of the spatial cells over time matches any of the one or more travel patterns;

generating, by the computing device, a message indicating the vehicle behavior is detected;

adjusting a resolution of the spatial cells for additional pattern analysis; and repeating steps (a)-(c) for the spatial cells with the adjusted resolution for one or more additional travel patterns that define a vehicle behavior.

2. The method of claim 1, further comprising:

based on the group of the different ones of the spatial cells over time matching any of the one or more travel patterns, detecting multiple of the one or more vehicles co-traveling based on a temporal analysis of the geohash values stored in the hash library; and wherein the message indicates the multiple of the one or more vehicles are co-traveling.

3. The method of claim 1, wherein analyzing the hash library is performed in real-time.

4. The method of claim 1, further comprising:

assigning processing nodes of a distributed computing system to the spatial cells.

5. A non-transitory computer readable medium including programmed instructions executable by a processor, wherein the instructions, when executed, direct the processor to perform a method of continuous vehicle behavior detection, the method comprising:

receiving a vehicle behavior profile including one or more travel patterns that define a vehicle behavior;

receiving track data of one or more vehicles;

hashing the track data as it is received to generate geohash values that uniquely identify spatial cells that approximate locations of the one or more vehicles;

storing the geohash values in a hash library;

continually analyzing the hash library as the geohash values are stored, for multiple of the one or more vehicles, to determine whether a group of different ones of the spatial cells over time matches any of the one or more travel patterns in the vehicle behavior profile;

in response to determining the group of the different ones of the spatial cells over time matches any of the one or more travel patterns, generating a message indicating the vehicle behavior is detected; and in response to determining the group of the different ones of the spatial cells over time do not match any of the one or more travel patterns, deallocating memory in the hash library for geohash values corresponding to the group of the different ones of the spatial cells that do not match any of the one or more travel patterns.

6. The non-transitory computer readable medium of claim 5, wherein the method further comprises: based on the group of the different ones of the spatial cells over time matching any of the one or more travel patterns, detecting multiple vehicles co-traveling based on a temporal analysis of the geohash values stored in the hash library; and wherein the message indicates the multiple of the one or more vehicles are co-traveling.

7. The non-transitory computer readable medium of claim 6, wherein the temporal analysis is performed in real-time.

8. The non-transitory computer readable medium of claim 5, wherein the method further comprises, based on the group of the different ones of the spatial cells over time matching any of the one or more travel patterns over a threshold length of time:

initiating an additional pattern analysis in response to detecting the vehicle behavior; and adjusting a resolution of the cells for the additional pattern analysis.

9. A vehicle behavior detection system comprising:

a communication interface configured to receive a vehicle behavior profile including one or more travel patterns that define a vehicle behavior;

a vehicle behavior analytics platform comprising:

a continuous stream interface configured to receive track data of one or more vehicles; and hash processor nodes configured to geohash the track data as it is received to generate hash values that uniquely identify spatial cells that approximate locations of the one or more vehicles;

a hash library configured to store the geohash values; and a behavior detection processor configured to:

analyze the hash library as the geohash values are stored, for multiple of the one or more vehicles, to determine whether a group of different ones of the spatial cells over time matches any of the one or more travel patterns in the vehicle behavior profile;

in response to determining the group of the different ones of the spatial cells over time matches any of the one or more travel patterns, generate a message indicating the vehicle behavior is detected; and in response to determining the group of the different ones of the spatial cells over time do not match any of the one or more travel patterns, deallocate memory in the hash library for geohash values corresponding to the group of the different ones of the spatial cells that do not match any of the one or more travel patterns.

10. The vehicle behavior detection system of claim 9, wherein:

the behavior detection processor is configured to, based on the group of the different ones of the spatial cells over time matching any of the one or more travel patterns, detect multiple vehicles co-traveling based on a temporal analysis of the hash values stored in the hash library; and wherein the message indicates the multiple of the one or more vehicles are co-traveling.

11. The vehicle behavior detection system of claim 10, wherein the temporal analysis is performed in real-time.

12. The vehicle behavior detection system of claim 9, wherein the hash processor nodes are assigned to the cells to distribute the hash processing.

13. The vehicle behavior detection system of claim 9, wherein:

the behavior detection processor is configured to, based on the group of the different ones of the spatial cells over time matching any of the one or more travel patterns over a threshold length of time, initiate an additional pattern analysis in response to detecting the vehicle behavior, and to adjust a resolution of the cells for the additional pattern analysis.

* * * * *